July 8, 1930.  J. C. SCHLEICHER  1,770,044
SEA FLOAT
Filed Sept. 3, 1927  3 Sheets-Sheet 1
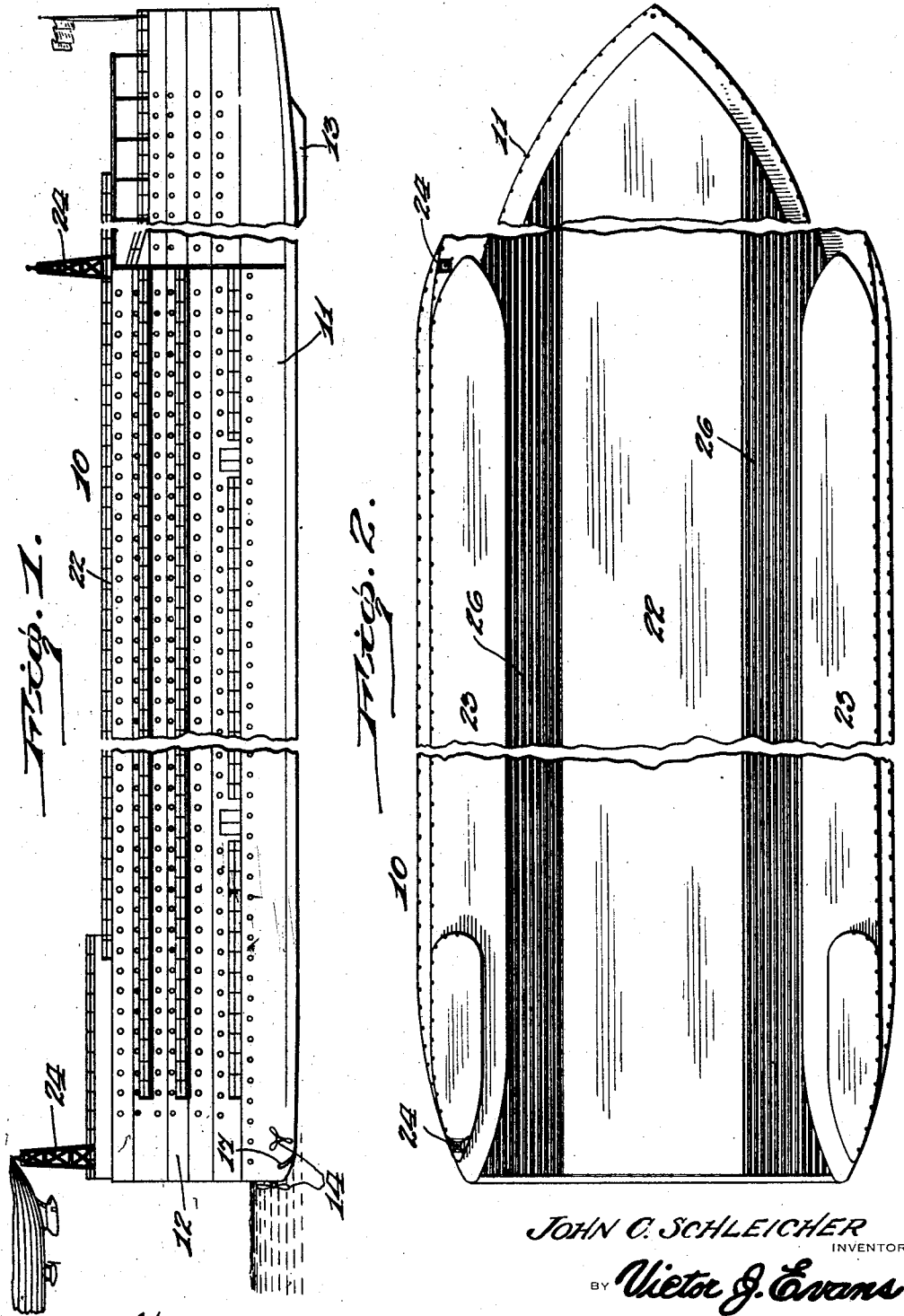
JOHN C. SCHLEICHER
INVENTOR July 8, 1930.  J. C. SCHLEICHER  1,770,044
SEA FLOAT
Filed Sept. 3, 1927    3 Sheets-Sheet 2
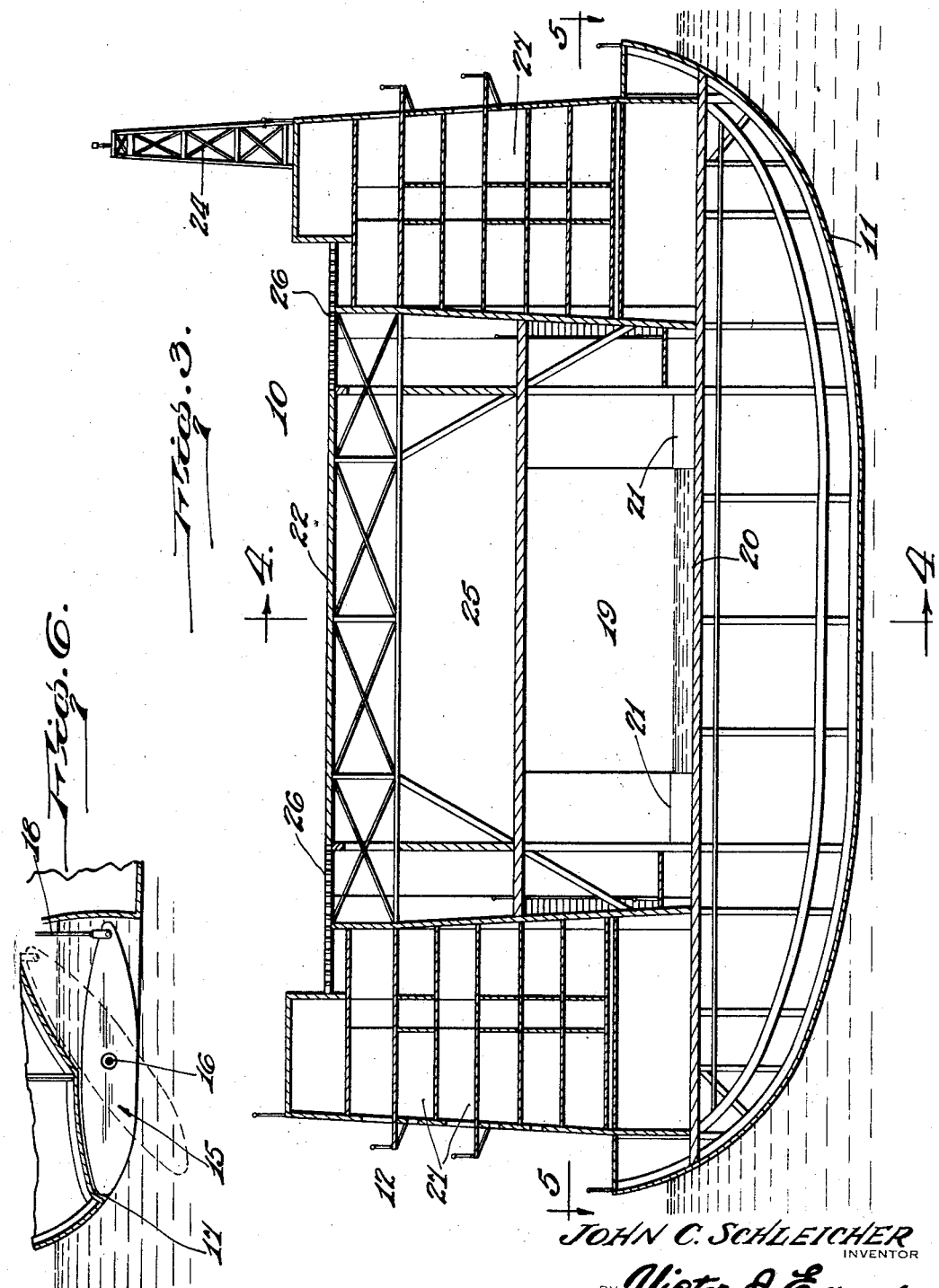

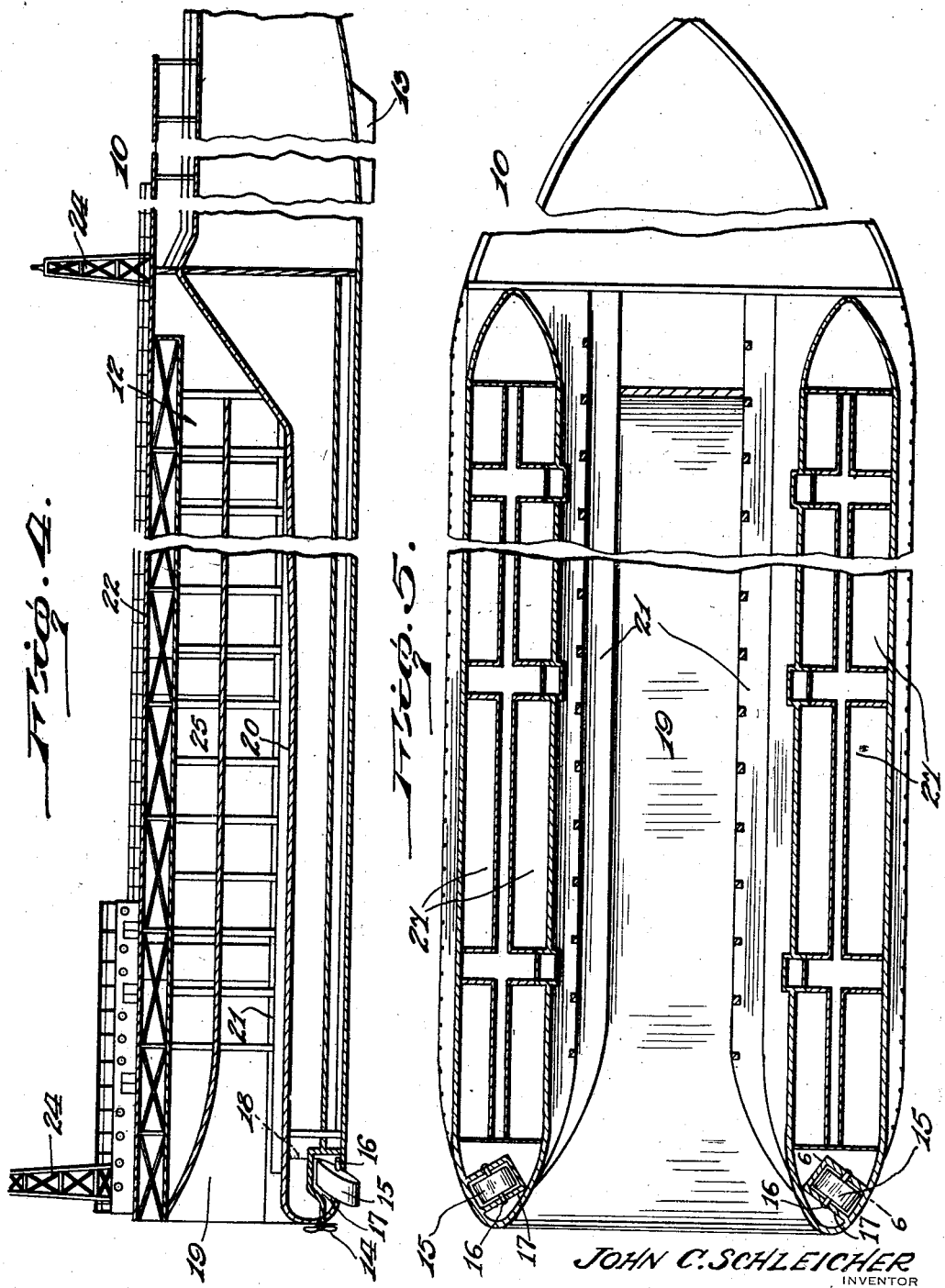

Patented July 8, 1930

1,770,044

UNITED STATES PATENT OFFICE

JOHN C. SCHLEICHER, OF BRONX, NEW YORK

SEA FLOAT

Application filed September 3, 1927. Serial No. 217,394.

This invention relates to improvements in sea floats.

The primary object of the invention is to provide a float of mammoth proportion for use as stations at suitable spaced distances across oceans and other wide bodies of water, and is especially adapted for use as a landing float for all types of air craft for increasing the safety of aircraft in traversing such bodies of water.

Another object of the invention resides in a sea float which resembles the hull of a giant ocean liner in which means is provided for keeping the same in the same general location on a body of water against the elements, without anchoring the same to the ocean body, which latter method is impractical for use on bodies of water of great depths.

Another object is the provision of a sea float embodying landing means for land aircraft and hydro-aircraft, and anchoring means for the "lighter-than-air-craft" such as dirigibles and balloons, in addition to ample deck space, store rooms, living quarters for crew and guests, and recreation halls for those on board.

Another object is to provide a sea float which includes all the conveniences of a modern hotel and which may be run on the plans of such to make the same a profitable business proposition.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 1 is a side elevation of my improved sea float.

Figure 2 is a top plan view thereof.

Figure 3 is a vertical transverse sectional view therethrough.

Figure 4 is a vertical longitudinal sectional view therethrough on the line 4—4 of Figure 3.

Figure 5 is a horizontal sectional view on the line 5—5 of Figure 3.

Figure 6 is a detail sectional view on the line 6—6 of Figure 5.

Referring more particularly to the drawings, the reference numeral 10 designates my improved sea float in its entirety which includes a buoyant hull 11 having stream lines and resembling the hull of a giant ocean liner but of a length greatly in excess to the ocean liners now in use. A superstructure 12 rises upward from the hull 11 and extends the length thereof. The hull and superstructure are constructed of structural steel such as now used in ship building so that a description of the specific parts and materials is not believed necessary. The hull 11 is provided with a downwardly extending fin or keel 13 adjacent the bow end thereof to aid in maintaining the bow end into the wind when the float is freely anchored in a body of water as it is the purpose to prevent any great amount of drift of the float when given a set position upon a vast body of water. These floats are to be arranged in spaced relation across oceans from one continent to another, and their positions will be identified by longitude and latitude. The hull 11 has a flat stern having motor driven propellers 14 at opposite sides thereof which serve to hold the float against drifting by reason of wind and by the operation of which the float may be swung around to various positions and which co-operate with the fin 13 to hold the bow into the wind. Also mounted at the stern on opposite sides of the longitudinal axis of the hull are rudders 15 which are pivoted on a horizontal axis midway between their ends as at 16 to swing vertically so that the opposite ends thereof counterbalance. The rudders may be swung into pockets 17 in the hull when not in use to reduce resistance, but may be extended beyond the bottom of the hull to vary their depth into the water to set up resistance to prevent swinging of the stern. The rudders may be used for steering purposes the same as any other rudder as they extend outward at an angle with respect to the longitudinal axis of the hull and are operated up and down by the actuation of cables 18 fixed to the inner ends thereof and extending into the hull for manual operation. The normal tendency of the rudders is to lie within the pockets but may be extended by pulling upward upon the operating cables.

The central body of the superstructure is provided with a harbor 19 which opens through the stern of the hull. The bottom 20 of the harbor is disposed below the water level of the hull and gradually rises toward the bow so that the depth of the same varies. The sea water covers the bottom of the harbor and provides a landing harbor and anchorage for sea planes. When not used as such, the same may be used as a swimming pool for guests on board the float. The sides of the harbor or pool have walks or platforms 21 for landing persons from the sea planes and for bathers when used for swimming.

The top deck of the superstructure constitutes a landing platform 22 having promenade decks 23 along the sides fully protected on the outside by railings. The landing platform is open at the rear to permit land planes to land and take off. A portion of the landing platform may be divided off to accommodate the storage of planes.

Rising above the top deck are masts 24 to which dirigibles and balloons may anchor. These masts may be of the kind now used for mooring such craft at sea.

The space interposed between the landing platform and the top of the harbor or pool and designated at 25 may be used as a recreation hall having a seating capacity in proportion to the guest accommodations of the sea float and in which entertainments may be provided for the recreation of the guests. This space may be divided up into several different rooms if desired. For the purpose of admitting light into the hall 25, I provide the landing platform with gratings 26 through which daylight and fresh air may penetrate.

Disposed on opposite sides of the superstructure are living compartments 27 any number of tiers or decks of which may be provided. Access to the various decks may be had by stairways and elevators as will readily be appreciated.

As hereinbefore stated, these sea floats are to be stationed at suitable spaced intervals over a body of water for use as landing and fuel filling stations for all types of aircraft. They are not anchored in any way to the ocean bottom but are free, however, their general location is maintained by the gear hereinbefore mentioned. In stormy weather, the bow of the float will always head into the wind and any deviation may be overcome by the propellers and rudder.

It will be appreciated that my sea-float has many possibilities, some of which have been pointed out. Among others is the use of plans for ball rooms, dining rooms, radio and wireless rooms, the use of the recreation room for balls, concerts, moving pictures, boxing exhibitions and the like. The lower compartments below the water line may be used as power plants, electrical plants, fuel storage, water tanks, refrigerators and cargoes for food and other essential supplies. Also storage space for goods for shipping and exchange of trade. The living quarters in the superstructure may be used for private living suites, private baths, Turkish baths, Russian baths, tonsorial parlors, beauty parlors, sun and electrical baths, hospital, bank, business exchange, rest rooms, etc. The float may be equipped to offer all the luxuries of a first class hotel and in itself it may be termed a "floating city." Furthermore, it will serve to establish quicker travel between nations and will tend to increase the better relations and good will among different nationalities.

In addition to the purposes mentioned, the top deck may serve as a convenient location for a beacon, search lights, derricks for lifting aircraft from the water to the deck, a machine shop for the repair of planes, mechanics' quarters. The harbor and pool may also be used as an enclosed pond for boating.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A sea float comprising a buoyant hull, a superstructure rising from said hull and divided interiorly into various living compartments, a landing platform on the top of said superstructure, a fin extending downwardly from said hull adjacent the bow of said hull for maintaining the sea float bow on into the wind, and means located at opposite sides of the stern of said hull movable to positions within and below the same for resisting lateral movement of the stern end of the seafloat when in lowered position below said hull.

2. A sea-float comprising a buoyant hull, and a compartment within said hull opening out through one end thereof, the bottom of said compartment being disposed below the water line of said hull to allow sea water to enter the same, a fin extending downwardly from said hull adjacent the bow of said hull for maintaining the sea-float bow on into the wind, and means located at opposite sides of the stern of said hull movable to positions within and below the same for resisting lateral movement of the stern end of the sea-float when in lowered position below said hull.

3. A sea-float for aircraft comprising a buoyant hull, a water compartment within said hull and opening out through one end thereof, the bottom of said compartment being disposed below the water line of said hull to allow sea water to enter the same, a superstructure rising from said hull, a landing platform on the top of said superstructure, and living compartments disposed on opposite sides of said water compartment and extending from said hull to the landing platform.

4. A sea-float having landing facilities for all types of aircraft comprising a hull, a fin extending downwardly from said hull adjacent the bow of the same, and means located at opposite sides of the stern for resisting lateral movement of the stern end of the sea-float, said means including rudders pivoted on a horizontal axis for movement into and out of pockets provided in the bottom of said hull.

5. In a sea float for aircraft, a hull having pockets in the underside of the stern at opposite sides thereof, and rudders pivoted on a horizontal axis within said pockets for swinging movement at an angle with respect to the longitudinal axis of said hull for movement to an idle position within said pockets and to an extended operative position beyond the same.

In testimony whereof I have affixed my signature.

JOHN C. SCHLEICHER.